United States Patent
Wang

(10) Patent No.: US 11,699,264 B2
(45) Date of Patent: Jul. 11, 2023

(54) METHOD, SYSTEM AND COMPUTING DEVICE FOR RECONSTRUCTING THREE-DIMENSIONAL PLANES

(71) Applicant: INDUSTRIAL TECHNOLOGY RESEARCH INSTITUTE, Hsinchu (TW)

(72) Inventor: Te-Mei Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 196 days.

(21) Appl. No.: 16/881,104

(22) Filed: May 22, 2020

(65) Prior Publication Data
US 2021/0201577 A1    Jul. 1, 2021

(30) Foreign Application Priority Data

Dec. 27, 2019    (TW) ................... 108148098

(51) Int. Cl.
*G06T 17/20*    (2006.01)
*G06T 7/90*    (2017.01)
(Continued)

(52) U.S. Cl.
CPC .............. *G06T 17/205* (2013.01); *G06T 7/11* (2017.01); *G06T 7/40* (2013.01); *G06T 7/50* (2017.01);
(Continued)

(58) Field of Classification Search
CPC . G06T 2207/10028; G06T 2207/10016; G06T 17/00; G06T 7/55; G06T 5/005;
(Continued)

(56) References Cited

U.S. PATENT DOCUMENTS 8,798,965 B2    8/2014 Quan et al.
9,613,423 B2    4/2017 Dixon et al.
(Continued)

FOREIGN PATENT DOCUMENTS

CN    104318622 A    1/2015
CN    104599314 A    5/2015
(Continued)

OTHER PUBLICATIONS

Taiwanese Office Action and Search Report, dated Sep. 29, 2020, for Taiwanese Application No. 108148098.
(Continued)

*Primary Examiner* — Xiao M Wu
*Assistant Examiner* — Scott E Sonners
(74) *Attorney, Agent, or Firm* — Birch, Stewart, Kolasch & Birch, LLP

(57) ABSTRACT

A method, a system, and a computing device for reconstructing three-dimensional planes are provided. The method includes the following steps: obtaining a series of color information, depth information and pose information of a dynamic scene by a sensing device; extracting a plurality of feature points according to the color information and the depth information, and marking part of the feature points as non-planar objects including dynamic objects and fragmentary objects; computing point cloud according to the unmarked feature points and the pose information, and instantly converting the point cloud to a three-dimensional mesh; and growing the three-dimensional mesh to fill vacancy corresponding to the non-planar objects according to the information of the three-dimensional mesh surrounding or adjacent to the non-planar objects.

14 Claims, 6 Drawing Sheets

(51) Int. Cl.
  *G06T 7/73* (2017.01)
  *G06T 17/00* (2006.01)
  *G06T 7/11* (2017.01)
  *G06T 7/50* (2017.01)
  *G06T 7/40* (2017.01)
  *G06T 7/12* (2017.01)

(52) U.S. Cl.
  CPC ............. *G06T 7/73* (2017.01); *G06T 7/90* (2017.01); *G06T 17/00* (2013.01); *G06T 17/20* (2013.01); *G06T 7/12* (2017.01); *G06T 2207/10016* (2013.01); *G06T 2207/10024* (2013.01); *G06T 2207/10028* (2013.01); *G06T 2210/56* (2013.01)

(58) Field of Classification Search
  CPC ......... G06T 7/337; G06T 17/05; G06T 17/20; G06T 19/006; G06T 2200/04; G06T 2200/08; G06T 2207/30244; G06T 7/11; G06T 7/12; G06T 7/33; G06T 7/579; G06T 7/73; G06T 15/08; G06T 15/20; G06T 15/205; G06T 17/205; G06T 2207/20021; G06T 2215/16; G06T 7/174; G06T 7/20; G06T 7/50; G06T 7/521; G06T 7/564; G06T 7/60; G06T 7/70; G06T 7/75; G06T 7/80; G06V 20/64; G06V 10/44; G06V 10/457; G06V 20/20; G06V 20/647; G06V 10/25; G06V 20/52; G06V 2201/12; G06F 3/011; G06K 9/6267; G06K 9/629; H04N 13/271; H04N 13/111
  See application file for complete search history.

(56) References Cited

U.S. PATENT DOCUMENTS

| | | | |
|---|---|---|---|
| 9,646,410 B2 | 5/2017 | Collet Romea et al. | |
| 9,953,618 B2 | 4/2018 | Ramachandran et al. | |
| 2016/0055268 A1* | 2/2016 | Bell | G06T 17/00 703/1 |
| 2018/0018805 A1 | 1/2018 | Kutliroff et al. | |
| 2018/0253856 A1 | 9/2018 | Price et al. | |
| 2018/0253894 A1 | 9/2018 | Krishnan et al. | |
| 2019/0340746 A1* | 11/2019 | Lu | G06V 10/764 |
| 2019/0392228 A1* | 12/2019 | Zhu | G06T 7/73 |
| 2020/0349761 A1* | 11/2020 | Zhang | G06T 15/10 |
| 2020/0410293 A1* | 12/2020 | Bergmann | G01S 17/42 |
| 2021/0004630 A1* | 1/2021 | Uscinski | G06F 3/013 |
| 2021/0256776 A1* | 8/2021 | Cappello | G06T 7/90 |
| 2021/0334988 A1* | 10/2021 | Xiao | G06V 20/56 |

FOREIGN PATENT DOCUMENTS

| | | |
|---|---|---|
| CN | 106780646 A | 5/2017 |
| CN | 107274477 A | 10/2017 |
| CN | 108171780 A | 6/2018 |
| CN | 108335357 A | 7/2018 |
| CN | 108921078 A | 11/2018 |
| CN | 105493155 B | 2/2019 |
| CN | 110148217 A | 8/2019 |
| TW | 201128569 A1 | 8/2011 |
| TW | 201944358 A | 11/2019 |

OTHER PUBLICATIONS

Bescos et al., "DynaSLAM: Tracking, Mapping, and Inpainting in Dynamic Scenes", IEEE Robotics and Automation Letters, 2018, vol. 3, No. 4, pp. 4076-4083.

Jiang et al., "Static-Map and Dynamic Object Reconstruction in Outdoor Scenes Using 3-D Motion Segmentation", IEEE Robotics and Automation Letters, 2016, vol. 1, No. 1, pp. 324-331.

Li et al., "Indoor Localization with Occlusion Removal", IEEE 2017, pp. 191-198.

Liu et al., "PlaneRCNN: 3D Plane Detection and Reconstruction from a Single Image", 2019, Total 16 pages.

Tan et al., "Robust Monocular SLAM in Dynamic Environments", 2013, Total 10 pages.

* cited by examiner

METHOD, SYSTEM AND COMPUTING DEVICE FOR RECONSTRUCTING THREE-DIMENSIONAL PLANES

This application claims the benefit of Taiwan application Serial No. 108148098, filed Dec. 27, 2019, the disclosure of which is incorporated by reference herein in its entirety.

TECHNICAL FIELD

The disclosure relates in general to a method, a system, and a computing device for reconstructing three-dimensional planes.

BACKGROUND

Reconstructing three-dimensional planes of a scene by a mobile device is useful for architecture design, interior design, space layout, etc. In these applications, only planar structure is required in the reconstructed 3D model.

However, existing approaches cannot automatically exclude non-planar objects nor moving objects. Many approaches are limited in static scene, they could not reconstruct a correct 3D scene model with walking people or moving objects.

Usually the 3D scene model reconstructed by existing methods contains huge amount of point cloud that occupy lots of storage. Most vertices in the point cloud are unnecessary for planar structures because each plane only requires 3 or 4 vertices.

Therefore, a new method is developed for scanning and reconstructing three-dimensional planar structures in the dynamic scene to solve the issues mentioned above and improve the efficiency and quality.

SUMMARY

According to one embodiment, a method for reconstructing three-dimensional planes is provided. The method includes the following steps: obtaining a series of color information, depth information and pose information of a dynamic scene by a sensing device; extracting a plurality of feature points according to the color information and the depth information, and marking part of the feature points as non-planar objects including dynamic objects and fragmentary objects; computing point cloud according to the unmarked feature points and the pose information, and instantly converting the point cloud to a three-dimensional mesh; and growing the three-dimensional mesh to fill vacancy corresponding to the non-planar objects according to information of the three-dimensional mesh surrounding or adjacent to the non-planar objects.

According to another embodiment, a system for reconstructing three-dimensional planes is provided. The system includes a sensing device and a computing device. The sensing device is configured to obtain a series of color information, depth information and pose information of a dynamic scene. The computing device includes a feature point extraction unit, a non-planar objects marking unit, a mesh computing unit and a mesh filling unit. The feature point extraction unit is configured to extract a plurality of feature points according to the color information and the depth information. The non-planar objects marking unit is configured to mark part of the feature points as non-planar objects including dynamic objects and fragmentary objects. The mesh computing unit is configured to compute point cloud according to the unmarked feature points and the pose information, and instantly convert the point cloud to a three-dimensional mesh. The mesh filling unit is configured to grow the three-dimensional mesh to fill vacancy corresponding to the non-planar objects according to information of the three-dimensional mesh surrounding or adjacent to the non-planar objects.

According to an alternate embodiment, a computing device is provided. The computing device includes a feature point extraction unit, a non-planar objects marking unit, a mesh computing unit and a mesh filling unit. The feature point extraction unit configured to extract a plurality of feature points according to color information and depth information. The non-planar objects marking unit is configured to mark part of the feature points as non-planar objects including dynamic objects and fragmentary objects. The mesh computing unit is configured to compute point cloud according to the unmarked feature points and the pose information, and instantly convert the point cloud to a three-dimensional mesh. The mesh filling unit is configured to grow the three-dimensional mesh to fill vacancy corresponding to the non-planar objects according to information of the three-dimensional mesh surrounding or adjacent to the non-planar objects.

The above and other aspects of the invention will become better understood with regard to the following detailed description of the preferred but non-limiting embodiment(s). The following description is made with reference to the accompanying drawings.

DETAILED DESCRIPTION

Figure 1:
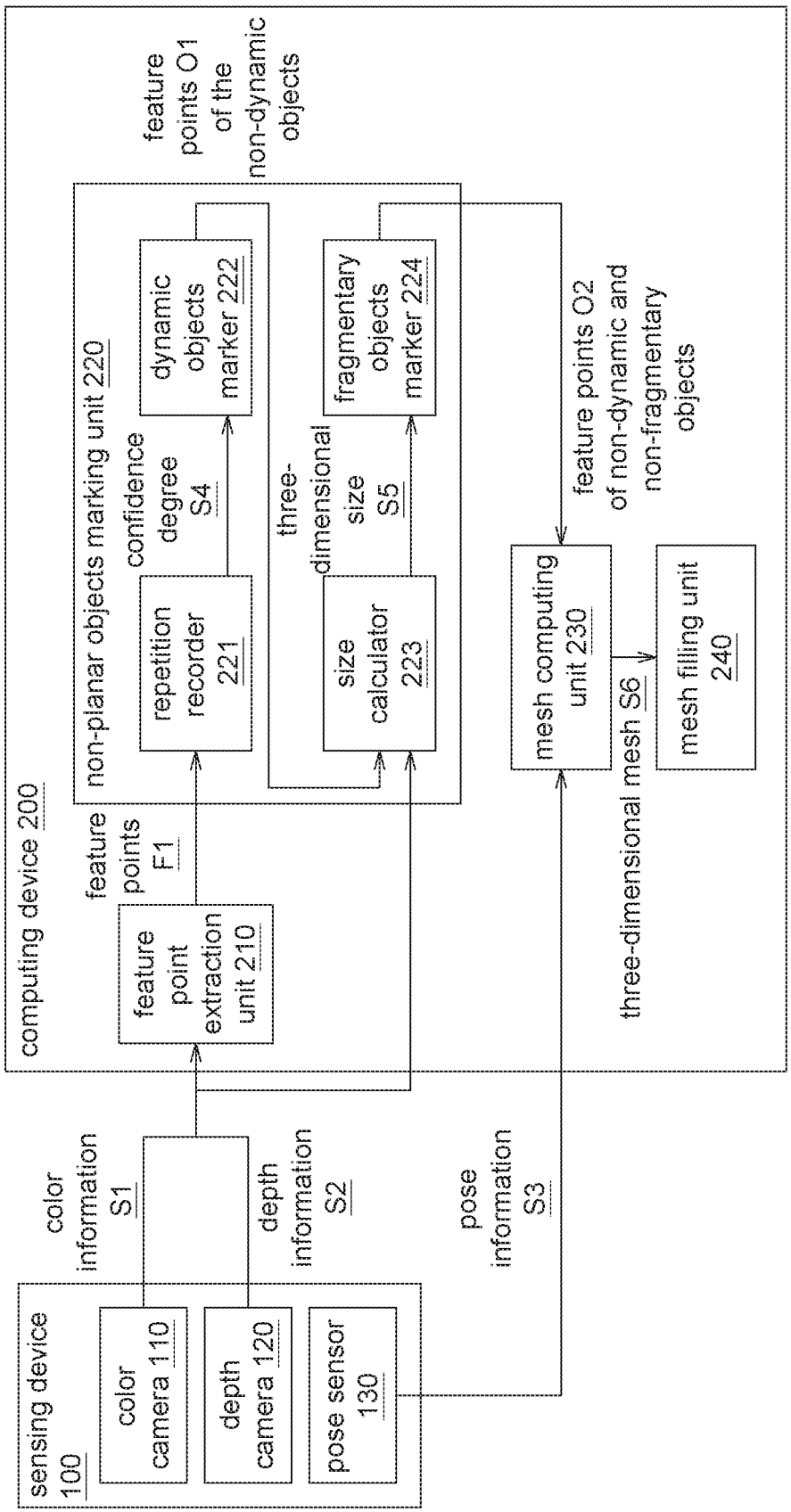
FIG. 1 is a schematic diagram of a system for reconstructing three-dimensional planes of a dynamic scene according to an embodiment.

Referring to FIG. 1, a schematic diagram of a system 1000 for reconstructing three-dimensional planes according to an embodiment is shown. The system 1000 includes a sensing device 100 and a computing device 200. The sensing device 100 includes a color camera 110, a depth camera 120 and a pose sensor 130. The color camera 110 can be realized by such as a video recorder or a camera with continuous shooting function. The depth camera 120 can be realized by such as a dual camera, a structured light depth camera or a time of flight (ToF) depth sensor. The pose sensor 130 can sense at least tri axial rotation directions and tri axial movement positions, and can be composed of one or multiple wide angle or fisheye cameras and an inertial measurement unit. The inertial measurement unit can be realized by such as a micro-electromechanical system (MEMS) with multiple degrees of freedom (DOF), and can be composed of a gyroscope, an accelerometer, or a magnetometer.

As indicated in FIG. 1, the computing device 200 includes a feature point extraction unit 210, a non-planar objects marking unit 220, a mesh computing unit 230 and a mesh filling unit 240. The computing device 200 can be realized by such as a processor, a chip, or a circuit disposed inside a computer, a server, a cloud computing center, or a head-mounted device. The feature point extraction unit 210 extracts a plurality of feature points according to the color information and the depth information. The non-planar objects marking unit 220 includes a repetition recorder 221, a dynamic objects marker 222, a size calculator 223 and a fragmentary objects marker 224. The repetition recorder 221 checks a series of frames obtained continuously, and computes the reliability of each feature point. Then, the dynamic objects marker 222 excludes the dynamic objects but reserves the feature points O1 of non-dynamic objects. The size calculator 223 calculates the three-dimensional size of the object according to the color information and the depth information (such as depth maps). Then, the fragmentary objects marker 224 excludes the fragmentary objects but reserves the feature points O2 of non-fragmentary objects. The mesh computing unit 230 computes the point clouds according to the feature points O2 and the pose information (such as the rotation of yaw/roll/pitch and the XYZ position) of non-dynamic and non-fragmentary objects, and instantly converts the point clouds to corresponding three-dimensional meshes. The vacancy of the dynamic objects and the fragmentary objects is filled by the three-dimensional mesh grown by the mesh filling unit 240 according to the information of the three-dimensional mesh surrounding or adjacent to the vacancy to create a complete three-dimensional planar structure. In the present embodiment, the feature point extraction unit 210, the non-planar objects marking unit 220, the mesh computing unit 230 and the mesh filling unit 240 adopt the continuous updating technology, hence reducing the required operating resources of memory and processor. Details of the operation of each element are disclosed below with an accompanying drawing.

Figure 2:
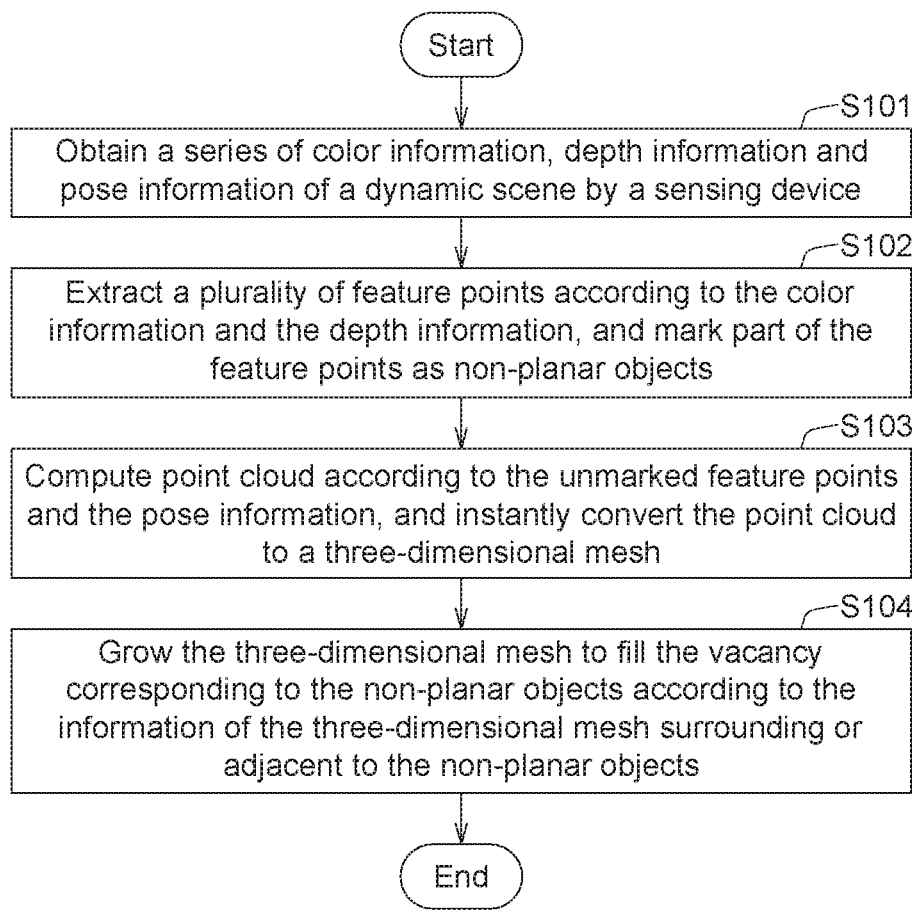
FIG. 2 is a flowchart of a method for reconstructing three-dimensional planes of a dynamic scene according to an embodiment.

FIG. 2 is a flowchart of a method for reconstructing three-dimensional planes according to an embodiment. In step S101, a series of color information S1, depth information S2 and pose information S3 of a dynamic scene are obtained by the sensing device 100. In the present step, the series of color information S1, depth information S2 and pose information S3 are obtained from several frames. The user, wearing a head-mounted device equipped with the sensing device 100, can walk and capture images at the same time to obtain a series of frames. In the present embodiment, a dynamic scene refers to the scene with a dynamic object such as walking persons. The color information S1, the depth information S2 and the pose information S3 of each frame correspond to the dynamic objects. Through the relation between the obtained information, the change of the dynamic objects in the scene can be observed.

In step S102, a plurality of feature points are extracted by the feature point extraction unit 210 according to the color information S1 and the depth information S2, and part of the feature points are marked as non-planar objects (including dynamic objects and fragmentary objects) by the non-planar objects marking unit 220. In the present step, the non-planar objects marking unit 220 checks a series of color information and depth information with corresponding feature points, and then marks and deletes the feature points of the frames determined as dynamic objects or fragmentary objects. Examples of the dynamic objects include people at their work or the vehicles. Examples of the fragmentary objects include messy stationeries. The procedures for marking dynamic objects and fragmentary objects are disclosed below with detailed flowcharts.

Figure 3:
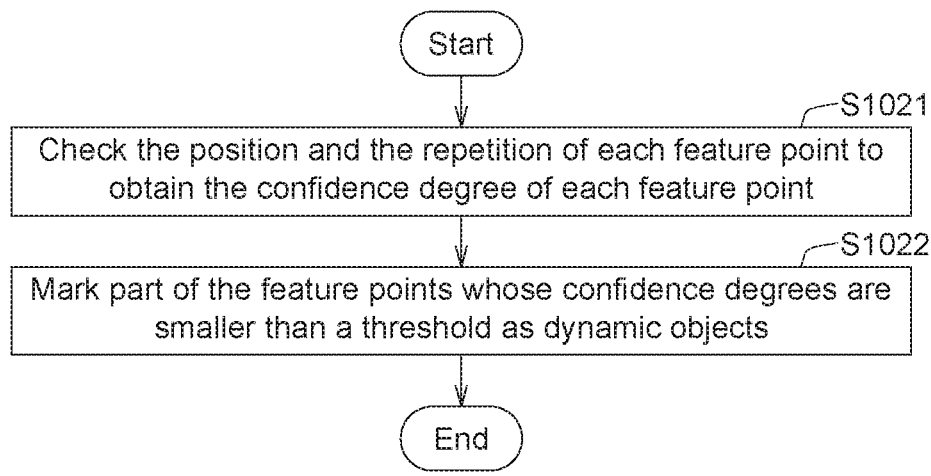
FIG. 3 is a detailed flowchart of the procedure of marking dynamic objects according to an embodiment.

Referring to FIG. 3, a detailed flowchart of the procedure of marking dynamic objects according to an embodiment is shown. The step S102 of FIG. 2 includes steps S1021 and S1022. In step S1021, the position and the repetition of each of the feature points F1 is checked by the repetition recorder 221 to obtain confidence degree S4 of each of the feature points F1.

Figure 4:
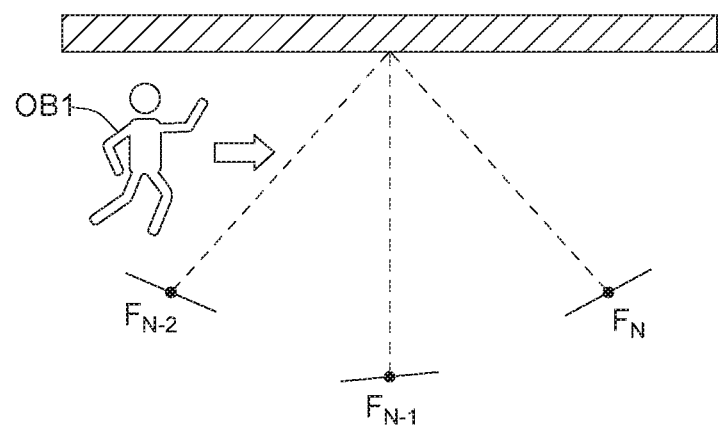
FIGS. 4 to 5 are schematic diagrams of an object according to an embodiment.
Figure 5:
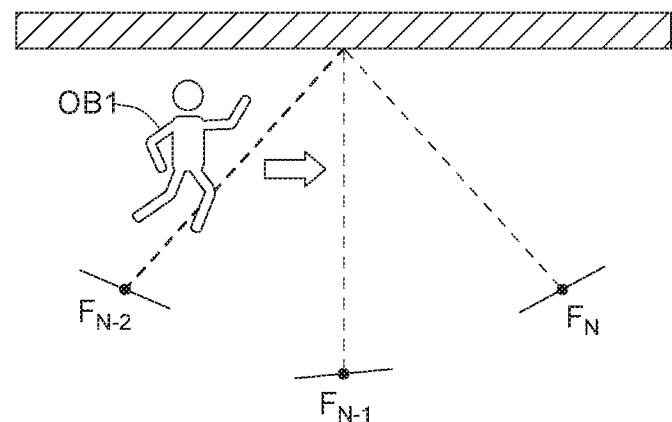

Referring to FIGS. 4 to 5, schematic diagrams of determining the reliability of feature points according to an embodiment are shown. FIG. 4 shows that the feature points of a static scene not interfered with by a moving object OB1 can be obtained from a series of images $F_{N-2}$, $F_{N-1}$ and $F_N$, and the reliability of the obtained feature points will be high (the feature points of the images $F_{N-2}$, $F_{N-1}$ and $F_N$ are not blocked by the moving object OB1). FIG. 5 shows that when the moving object OB1 moves, corresponding feature points of the moving object OB1 will not stably appear in the series of image $F_{N-2}$, $F_{N-1}$ and $F_N$ but will interfere with the feature points of the static scene. Therefore, the reliability of the obtained feature points will be low (for example, the feature points of image $F_{N-2}$ are blocked by the moving object OB1).

In step S1022, the feature points F1 whose confidence degrees S4 are smaller than a threshold are marked as dynamic objects and are deleted by the dynamic objects marker 222, and the feature points O1 of the non-dynamic objects are reserved. Then, whether the non-dynamic objects are fragmentary objects is checked.

Figure 6:
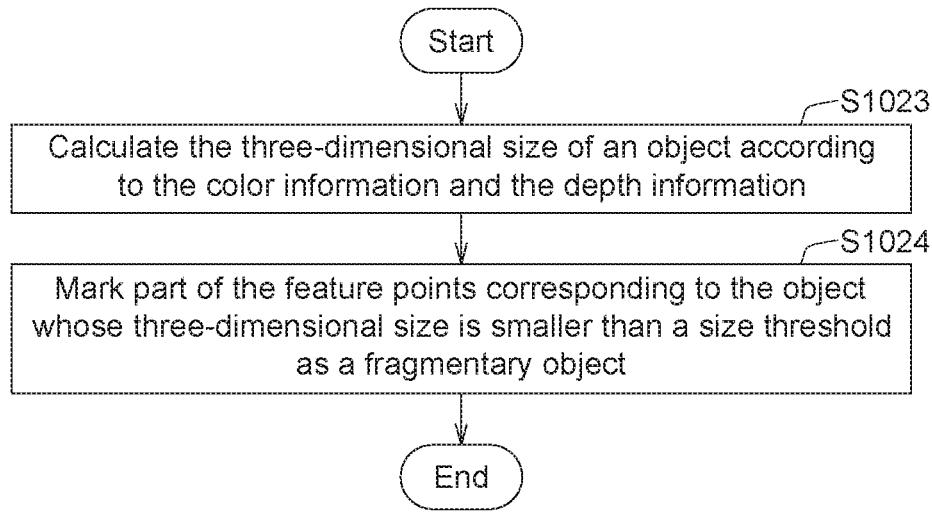
FIG. 6 is a detailed flowchart of the procedure of marking fragmentary objects according to an embodiment.

Referring to FIG. 6, a detailed flowchart of the procedure of marking fragmentary objects according to an embodiment is shown. The step S102 of FIG. 2 further includes steps S1023 and S1024. In step S1023, the three-dimensional size S5 of an object is calculated by the size calculator 223 by segmenting the object according to the color information S1 and the depth information S2 corresponding to the feature points O1 of the non-dynamic objects. For example, the portion with significant change in color or pattern can be located from the color information S1 and defined as an object edge, and a discontinuous boundary can be located from corresponding depth information S2. Then, the object is segmented according to the edge and the boundary, and the three-dimensional size S5 is calculated.

In step S1024, the feature points F1 corresponding to the object whose three-dimensional size S5 is smaller than a size threshold is marked as a fragmentary object and is deleted by the fragmentary object marker 224. After steps S1022 and S1024 are performed, the feature points O2 of non-dynamic and non-fragmentary objects are reserved, and the point cloud and the mesh are calculated.

The feature points F1 marked as dynamic objects or fragmentary objects will be excluded, and will not be used to construct or modify the three-dimensional mesh. Refer to the step S103 of FIG. 2. The point cloud is computed by the mesh computing unit 230 according to the feature points O2 of non-dynamic and non-fragmentary objects and the pose information S3, and is instantly converted to a three-dimensional mesh S6.

Figure 7:
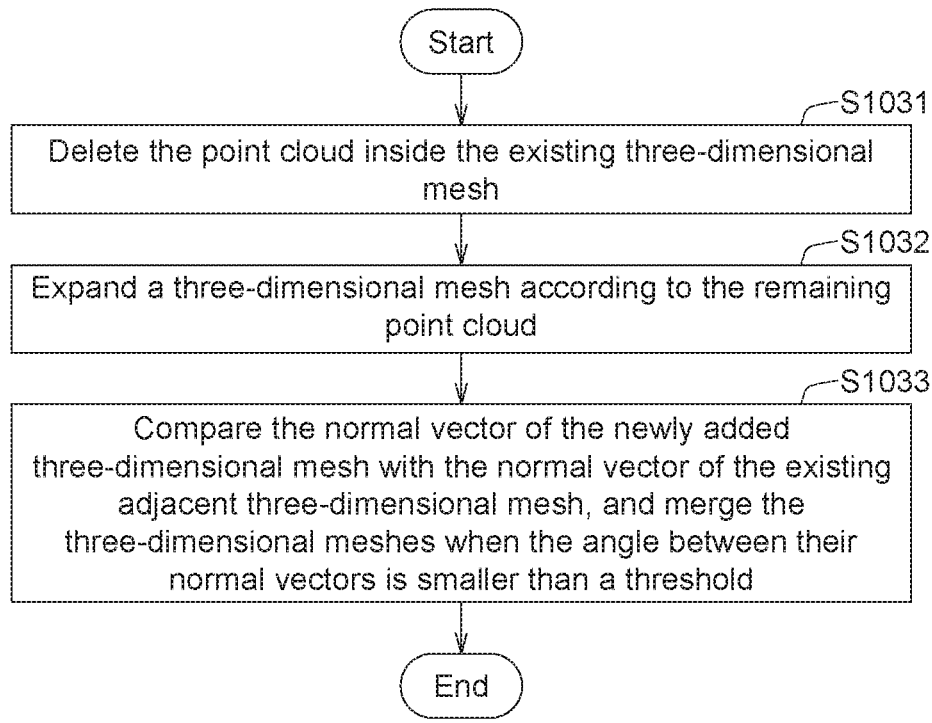
FIG. 7 is a detailed flowchart of the step S103 of FIG. 2.
Figure 8:
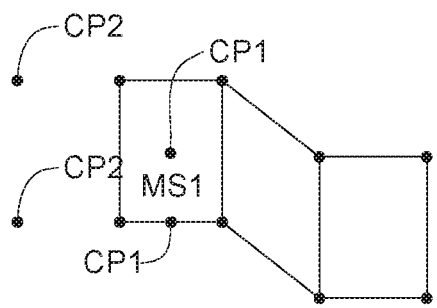
FIGS. 8 to 11 are exemplary diagrams of each step of FIG. 7.
Figure 9:
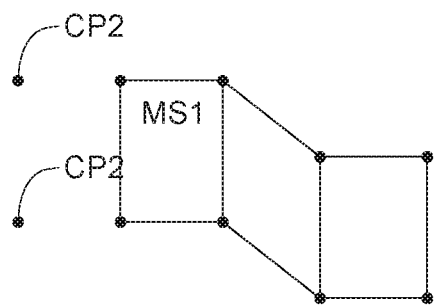

Refer to FIGS. 7 to 11. FIG. 7 is a detailed flowchart of the step of S103 of FIG. 2 for converting the point cloud to a three-dimensional mesh. FIGS. 8 to 11 are exemplary diagrams of each step of FIG. 7. In step S1031 as indicated in FIGS. 8 to 9, the point cloud CP1 inside the existing three-dimensional mesh MS1 is deleted by the mesh computing unit 230, such that the operating resources required for processing the point cloud could be reduced without affecting the structure of the three-dimensional mesh.

Figure 10:
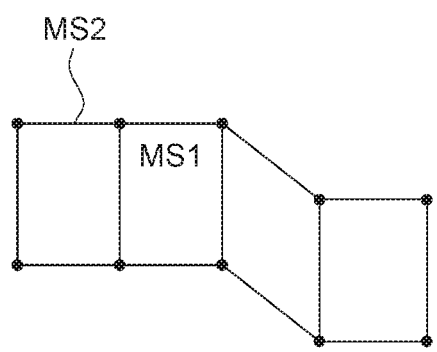

In step S1032 as indicated in FIGS. 9 to 10, a three-dimensional mesh MS2 is added by the mesh computing unit 230 according to the remaining point cloud CP2 outside the three-dimensional mesh MS1.

Figure 11:
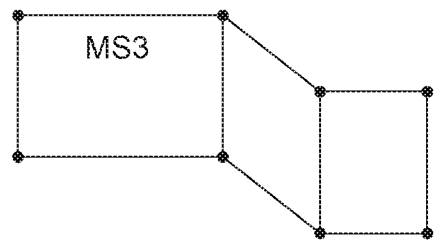

In step S1033 as indicated in FIG. 10 to 11, the normal vector of the newly added three-dimensional mesh MS2 is compared with the normal vector of the existing adjacent three-dimensional mesh MS1 by the mesh computing unit 230. When an angle between their normal vectors is smaller than a threshold, then the three-dimensional meshes MS1 and MS2 are merged as a three-dimensional mesh MS3 to reduce the number of meshes.

Figure 12:
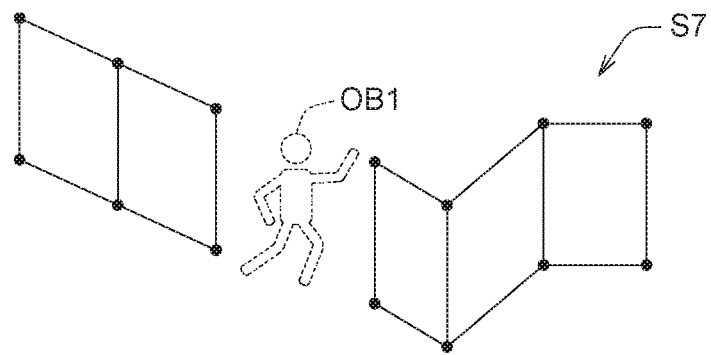
FIGS. 12 to 13 are schematic diagrams of the step S104 of FIG. 2.
Figure 13:
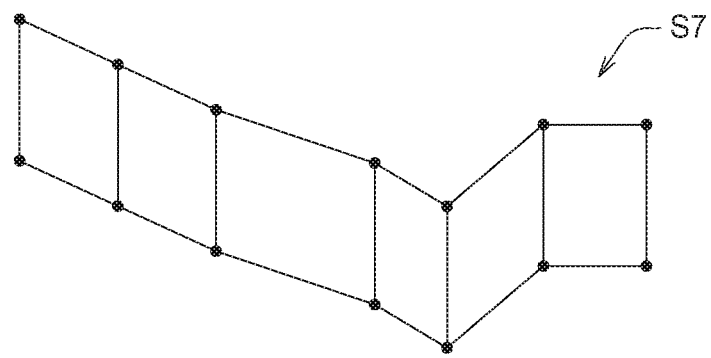

Details of the step of S104 of FIG. 2 are disclosed below. Refer to FIGS. 12 to 13. In step S104, the three-dimensional mesh is grown by the mesh filling unit 240 according to the three-dimensional mesh S6 surrounding or adjacent to the non-planar objects (such as dynamic objects) to fill the vacancy corresponding to the non-planar objects (such as dynamic objects). In the present step, the difference between the normal vector of the filled three-dimensional mesh and the normal vector of its surrounding or adjacent three-dimensional mesh marked as non-planar objects (such as dynamic objects) is smaller than a threshold.

Thus, during the computing process, there is no need to store a large volume of point cloud, and the construction of the three-dimensional planar structure only requires a small amount of memory and processor resources. As disclosed above, the method, the system, and the computing device for reconstructing three-dimensional planes of the disclosure are capable of obtaining three-dimensional planar structures by eliminating dynamic objects and fragmentary objects through the analysis of color information, depth information and feature points. Moreover, after a local point cloud is obtained, the local point cloud is instantly converted to a three-dimensional mesh, such that the memory required for storing the point cloud can be reduced. Meanwhile, since the three-dimensional mesh is continuously updated according to the newly generated point cloud, the processing efficiency can be increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for reconstructing three-dimensional planes, comprising:
   obtaining a series of color information, depth information and pose information of a dynamic scene by a sensing device;
   extracting a plurality of feature points according to the color information and the depth information from a plurality of two-dimensional frames, and marking part of the feature points as non-planar objects comprising dynamic objects and fragmentary objects;
   computing point cloud according to the unmarked feature points and the pose information, and converting the point cloud to a plurality of three-dimensional meshes; and
   growing the three-dimensional meshes to fill vacancy corresponding to the non-planar objects according to the information of the three-dimensional meshes surrounding or adjacent to the non-planar objects,
   wherein the step of marking part of the feature points as non-planar objects is performed before the step of converting the point cloud to the plurality of three-dimensional meshes,
   wherein the step of obtaining the color information, the depth information and the pose information, the step of extracting the feature points and marking part of the feature points as the non-planar objects, the step of computing the point cloud and converting the point cloud to the three-dimensional meshes, and the step of growing the three-dimensional meshes are repeatedly performed to continuously update the three-dimensional mesh, and
   wherein the three-dimensional meshes are continuously updated by deleting the point cloud inside the three-dimensional meshes; expanding the three-dimensional meshes according to the remaining point cloud; comparing the normal vectors of the three-dimensional meshes; and merging the three-dimensional meshes when the angle between their normal vectors is smaller than a threshold.

2. The method for reconstructing three-dimensional planes according to claim 1, wherein the sensing device comprises a color camera, a depth camera and a pose sensor.

3. The method for reconstructing three-dimensional planes according to claim 1, wherein the step of extracting the feature points according to the color information and the depth information, and marking the non-planar objects comprises:
   checking position and repetition of each of the feature points to obtain confidence degree of each of the feature points; and
   marking part of the feature points as the dynamic objects according to the confidence degrees of the feature points, wherein the confidence degrees of the feature points corresponding to the dynamic objects are smaller than a threshold.

4. The method for reconstructing three-dimensional planes according to claim 1, wherein the step of extracting the feature points according to the color information and the depth information, and marking the non-planar objects comprises:
   calculating three-dimensional size of an object according to the color information and the depth information; and
   marking part of the feature points as the fragmentary objects according to the three-dimensional size, wherein the three-dimensional size of each of the fragmentary objects is smaller than a size threshold.

5. The method for reconstructing three-dimensional planes according to claim 1, wherein in the step of growing the three-dimensional meshes to fill the vacancy corresponding to the non-planar objects according to the information of the three-dimensional meshes surrounding or adjacent to the non-planar objects, the angle between the normal vector of the adjacent three-dimensional meshes is smaller than a threshold.

6. A system for reconstructing three-dimensional planes, comprising:
   a sensing device configured to obtain a series of color information, depth information and pose information of a dynamic scene; and
   a computing device, comprising:
      a feature point extraction unit configured to extract a plurality of feature points according to the color information and the depth information from a plurality of two-dimensional frames;

a non-planar objects marking unit configured to mark part of the feature points as non-planar objects comprising dynamic objects and fragmentary objects;

a mesh computing unit configured to compute point cloud according to the unmarked feature points and the pose information, and convert the point cloud to a plurality of three-dimensional meshes; and a mesh filling unit configured to grow the three-dimensional meshes to fill vacancy corresponding to the non-planar objects according to the information of the three-dimensional meshes surrounding or adjacent to the non-planar objects, wherein the non-planar objects marking unit is configured to mark the part of the feature points as non-planar objects before the mesh computing unit converting the point cloud to the plurality of three-dimensional meshes, wherein the sensing device repeatedly obtains the color information, the depth information and the pose information, the feature point extraction unit repeatedly extracts the feature points, the non-planar objects marking unit repeatedly marks part of the feature points as the non-planar objects, the mesh computing unit repeatedly computes the point cloud and repeatedly converts the point cloud to the three-dimensional meshes, and the mesh filling unit repeatedly grows the three-dimensional meshes to continuously update the three-dimensional mesh, and wherein the three-dimensional mesh is continuously updated by deleting the point cloud inside the three-dimensional meshes; expanding the three-dimensional meshes according to the point cloud; comparing the normal vectors of the three-dimensional meshes; and merging the three-dimensional meshes when the angle between the normal vectors is smaller than a threshold.

7. The system for reconstructing three-dimensional planes according to claim 6, wherein the sensing device comprises a depth color camera, a depth camera and a pose sensor.

8. The system for reconstructing three-dimensional planes according to claim 6, wherein the non-planar objects marking unit comprises:

a repetition recorder configured to check position and repetition of each of the feature points to obtain confidence degree of each of the feature points; and a dynamic objects marker configured to mark part of the feature points as dynamic objects according to the confidence degrees of the feature points, wherein the confidence degrees of the feature points corresponding to the dynamic objects are smaller than a threshold.

9. The system for reconstructing three-dimensional planes according to claim 6, wherein the non-planar objects marking unit comprises:

a size calculator configured to calculate three-dimensional size of object according to the color information and the depth information; and a fragmentary objects marker configured to mark part of the feature points as the fragmentary objects according to the three-dimensional size, wherein the three-dimensional size of each of the fragmentary objects is smaller than a size threshold.

10. The system for reconstructing three-dimensional planes according to claim 6, wherein the angle between the normal vectors of the adjacent three-dimensional meshes is smaller than a threshold.

11. A computing device, comprising:

a feature point extraction unit configured to extract a plurality of feature points according to color information and depth information from a plurality of two-dimensional frames;

a non-planar objects marking unit configured to mark part of the feature points as non-planar objects comprising dynamic objects and fragmentary objects;

a mesh computing unit configured to compute point cloud according to the unmarked feature points and the pose information, and convert the point cloud to a plurality of three-dimensional meshes; and a mesh filling unit configured to grow the three-dimensional meshes to fill vacancy corresponding to the non-planar objects according to the information of the three-dimensional meshes surrounding or adjacent to the non-planar objects, wherein the non-planar objects marking unit is configured to mark the part of the feature points as non-planar objects before the mesh computing unit converting the point cloud to the plurality of three-dimensional meshes, wherein the feature point extraction unit repeatedly extracts the feature points, the non-planar objects marking unit repeatedly marks part of the feature points as the non-planar objects, the mesh computing unit repeatedly computes the point cloud and repeatedly converts the point cloud to the three-dimensional meshes, and the mesh filling unit repeatedly grows the three-dimensional meshes to continuously update the three-dimensional mesh, and wherein the three-dimensional mesh is continuously updated by deleting the point cloud inside the three-dimensional meshes; expanding the three-dimensional meshes according to the point cloud; comparing the normal vectors of the three-dimensional meshes; and merging the three-dimensional meshes when the angle between the normal vectors is smaller than a threshold.

12. The computing device according to claim 11, wherein the non-planar objects marking unit comprises:

a repetition recorder configured to check position and repetition of each of the feature points to obtain confidence degree of each of the feature points; and a dynamic objects marker configured to mark part of the feature points as dynamic objects according to the confidence degrees of the feature points, wherein the confidence degrees of the feature points corresponding to the dynamic objects are smaller than a threshold.

13. The computing device according to claim 11, wherein the non-planar objects marking unit comprises:

a size calculator configured to calculate three-dimensional size of object according to the color information and the depth information; and a fragmentary objects marker configured to mark part of the feature points as the fragmentary objects according to the three-dimensional size, wherein the three-dimensional size of each of the fragmentary objects is smaller than a size threshold.

14. The computing device according to claim 11, wherein the angle between the normal vectors of the adjacent three-dimensional meshes is smaller than a threshold.

* * * * *